US012809822B2

(12) United States Patent
Benedict

(10) Patent No.: US 12,809,822 B2
(45) **Date of Patent: *Nov. 24, 2026**

(54) MULTI-COMPONENT CONTENT ASSET TRANSFER

(71) Applicant: Comcast Cable Communications Management, LLC, Philadelphia, PA (US)

(72) Inventor: Danny Benedict, Seattle, VA (US)

(73) Assignee: Comcast Cable Communications Management, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/261,250

(22) Filed: Jul. 7, 2025

(65) Prior Publication Data

US 2025/0335400 A1 Oct. 30, 2025

Related U.S. Application Data

(63) Continuation of application No. 17/039,408, filed on Sep. 30, 2020, now Pat. No. 12,386,787, which is a continuation of application No. 15/723,053, filed on Oct. 2, 2017, now Pat. No. 10,838,924.

(51) Int. Cl.

| | |
|---|---|
| ***G06F 16/174*** | (2019.01) |
| ***G06F 16/16*** | (2019.01) |
| ***H04L 67/06*** | (2022.01) |
| ***H04L 67/1097*** | (2022.01) |

(52) U.S. Cl.

CPC ........ *G06F 16/1748* (2019.01); *G06F 16/162* (2019.01); *H04L 67/06* (2013.01); *H04L 67/1097* (2013.01)

(58) Field of Classification Search

CPC ... G06F 16/1748; G06F 16/162; H04L 67/06; H04L 67/1097

See application file for complete search history.

(56) References Cited

U.S. PATENT DOCUMENTS

| | | | | |
|---|---|---|---|---|
| 7,555,642 | B2 * | 6/2009 | Gagneraud | G06F 9/441 713/1 |
| 8,307,361 | B2 | 11/2012 | Zalewski | |
| 8,769,614 | B1 * | 7/2014 | Knox | H04L 65/612 726/3 |
| 9,124,911 | B2 * | 9/2015 | Rothschild | H04N 21/231 |
| 9,420,019 | B2 * | 8/2016 | Lam | H04L 65/762 |
| 9,866,459 | B1 * | 1/2018 | Joliveau | H04N 21/23439 |
| 9,866,650 | B2 * | 1/2018 | Sathyanarayana | H04L 65/612 |
| 2004/0167905 | A1 * | 8/2004 | Eakin | G06F 16/972 |
| 2006/0195866 | A1 * | 8/2006 | Thukral | H04N 21/44016 725/35 |
| 2007/0094142 | A1 * | 4/2007 | Russell | G06Q 30/06 705/52 |
| 2007/0157173 | A1 | 7/2007 | Klein et al. | |
| 2007/0208953 | A1 * | 9/2007 | Durand | G06F 21/10 713/193 |

(Continued)

*Primary Examiner* — Jared M Bibbee

(74) *Attorney, Agent, or Firm* — Ballard Spahr LLP

(57) ABSTRACT

Methods, systems, and apparatuses are described for multi-component asset transfer. A plurality of references can be generated from a manifest of a content asset. A monitoring agent can determine when a content item for the content asset is received and modify the state of the corresponding reference.

42 Claims, 6 Drawing Sheets

(56) References Cited

U.S. PATENT DOCUMENTS

2010/0064052 A1* 3/2010 Pickens ................. H04L 65/765 709/231
2010/0250772 A1* 9/2010 Mao ................. H04N 21/21815 709/231
2012/0079537 A1* 3/2012 Kalidindi ........... H04N 21/4755 725/116
2013/0198005 A1* 8/2013 Xiong .................. H04N 21/812 709/219
2013/0305303 A1* 11/2013 Yamagishi ....... H04N 21/64322 725/109
2014/0237525 A1* 8/2014 Rothschild ....... H04N 21/47202 725/92
2014/0317112 A1* 10/2014 Maharajh ............ G06F 16/7867 707/736
2014/0359081 A1* 12/2014 Van Deventer ......... H04L 67/63 709/219
2015/0012615 A1* 1/2015 Li ........................... H04L 65/70 709/219
2015/0256583 A1* 9/2015 Rosenzweig ........... H04L 65/65 709/219
2016/0006817 A1* 1/2016 Mitic ...................... H04L 65/65 709/232
2016/0065668 A1* 3/2016 Kumar .................... H04L 65/80 709/219
2016/0085955 A1* 3/2016 Lerner .................. H04L 9/0869 726/20
2016/0127440 A1* 5/2016 Gordon ................... H04L 65/80 709/219
2016/0149978 A1* 5/2016 Wissingh ......... H04N 21/26258 709/231
2016/0197975 A1* 7/2016 Law .................... H04L 67/1023 709/219
2016/0366202 A1* 12/2016 Phillips ............ H04N 21/23439
2017/0127147 A1* 5/2017 Crabtree ............ H04N 21/8456
2017/0171287 A1* 6/2017 Famaey ................ H04L 67/146
2017/0272485 A1* 9/2017 Gordon ................ H04N 21/222
2017/0331914 A1* 11/2017 Loach ...................... H04L 65/80
2017/0339114 A1* 11/2017 Watson .............. H04N 21/4825
2017/0353516 A1* 12/2017 Gordon .............. H04N 21/8456
2017/0357728 A1* 12/2017 Davies .................. G06F 16/248
2017/0366587 A1* 12/2017 Sharifi ............. H04N 21/25808
2018/0077219 A1* 3/2018 Tan .................. H04N 21/21815
2018/0077464 A1* 3/2018 Buchanan, Jr. ...... H04N 21/266
2018/0097864 A1* 4/2018 Brinkley ............... H04L 65/762
2018/0137208 A1* 5/2018 Ricker .................... H04L 9/065
2018/0284987 A1* 10/2018 Lazier ................... G06F 3/0647
2018/0285369 A1* 10/2018 Lazier ................... H04L 9/0894
2019/0058919 A1* 2/2019 Cahill .............. H04N 21/25866
2019/0075148 A1* 3/2019 Nielsen .............. H04N 21/6587
2019/0258998 A1* 8/2019 Deshpande ............ G06N 20/00

* cited by examiner

FIG. 3

300

```
<?xml version='1.0' encoding='UTF-8' standalone='yes'?>
<assembly manifestversion='1.0'>
  <asset name="Night of the Living Dead (1968)" type="film">
    <contentgroup name="feature">
      <content id="feature.mp4" type="video" checksum="1837465936"/>
      <content id="english.aac" type="audio" checksum="1849343548"/>
      <content id="spanish.aac" type="audio" checksum="1253748348"/>
      <content id="french.sub" type="text" checksum="1426374263"/>
      <content id="description.txt" type="text" checksum="1827472939"/>
      <content id="thumbnail.png" type="img" checksum="1895734758"/>
    </contentgroup>
    <contentgroup name="trailer">
      <content id="trailer.mp4" type="video" checksum="1938494765"/>
      <content id="trailerthumb.png" type="img" checksum="1928574934"/>
    </contentgroup>
  </asset>
</assembly>
```

302

304

306

MULTI-COMPONENT CONTENT ASSET TRANSFER

CROSS REFERENCE TO RELATED PATENT APPLICATION

This application is a continuation of U.S. patent application Ser. No. 17/039,408, filed Sep. 30, 2020, which is a continuation of U.S. patent application Ser. No. 15/723,053, filed Oct. 2, 2017, now U.S. Pat. No. 10,838,924, which are herein incorporated by reference in their entirety.

BACKGROUND

Multiple content items may be used to represent a particular content asset (e.g., a film). For example, a given film content asset may include content items for a main video feature, additional content items for trailers or extra content, still frames, metadata, and potentially other data. Existing solutions provide the entirety of the content asset, i.e., each content item that makes up the content asset, to an ingestion process once all of the content items have been received. These and other shortcomings are addressed by the approaches set forth herein.

SUMMARY

It is to be understood that both the following general description and the following detailed description are exemplary and explanatory only and are not restrictive. Provided are methods and systems for multi-component content asset transfer. A content asset is comprised of multiple content items. For example, a content asset for a film or television show can include a video content item for a main feature, and additional video content items for trailers, previews, or supplemental features. The content asset can also include still image content items for use in menus, program guides, or other user interfaces. Additionally, the content asset can include text data or metadata describing the given content asset. The content items that make up a content asset can be described in a manifest. The manifest can include a listing of content items that make up a given content asset. The manifest can also include identifiers for the content items, including file names, hash values, file identifiers, or other identifiers.

A monitoring agent for an ingestion process can determine if a manifest of a content asset has been received from a content source by determining whether the manifest is stored in a specific storage location such as a directory. The monitoring agent can generate a plurality of references corresponding to the content items listed in the manifest. The plurality of references can comprise a plurality of reference files, with each reference file corresponding to one of the content items listed in the manifest. Each of the plurality of references comprises an identifier of the corresponding content item, such as a file name or other identifier.

After generating the plurality of references, the monitoring agent can determine whether a content item of the content asset has been received from the content source. For example, the monitoring agent can determine whether the content item is stored in the monitored storage location. Determining whether the content item of the content asset has been received from the content source can be performed based on which of the references correspond to a first state. For example, the monitoring agent can determine if a given reference is in a first state, such as lacking a tag or header, or having a tag or header of a predefined value. If a reference is in a first state, the monitoring agent can then determine if the corresponding content item is stored in the storage location. If the plurality of references comprise a plurality of reference files, the monitoring agent can determine whether a reference file is stored in the monitored storage location.

If a content item is stored in a storage location, the monitoring agent can provide the content item to the ingestion process. The ingestion process can be implemented by one or more ingestion devices, e.g., one or more computing devices. The ingestion process can facilitate transcoding a content item. For example, the ingestion process can transcode a video or audio content item into variant content items of varying bitrates or resolutions. As another example, the ingestion process can perform a validation of a content item. Validation of a content item can include calculating a checksum, hash value, or other value to determine an integrity of a content item. After providing the content item to the ingestion process, the monitoring agent can modify a state of a reference corresponding to the content item from a first state to a second state. If the plurality of references comprise a plurality of reference files, the monitoring agent can delete the reference file corresponding to the content item.

The monitoring agent can continue to monitor the storage location until all references have been modified from the first state to the second state, e.g., all content items for the content asset have been received and provided to the ingestion process. The monitoring agent can provide the manifest to the ingestion process, indicating to the ingestion process that the entirety of the content asset has been provided to the ingestion process.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, show examples and together with the description, serve to explain the principles of the methods and systems:

FIG. 3 is a representation of an example manifest for a content asset;

DETAILED DESCRIPTION

Figure 1:
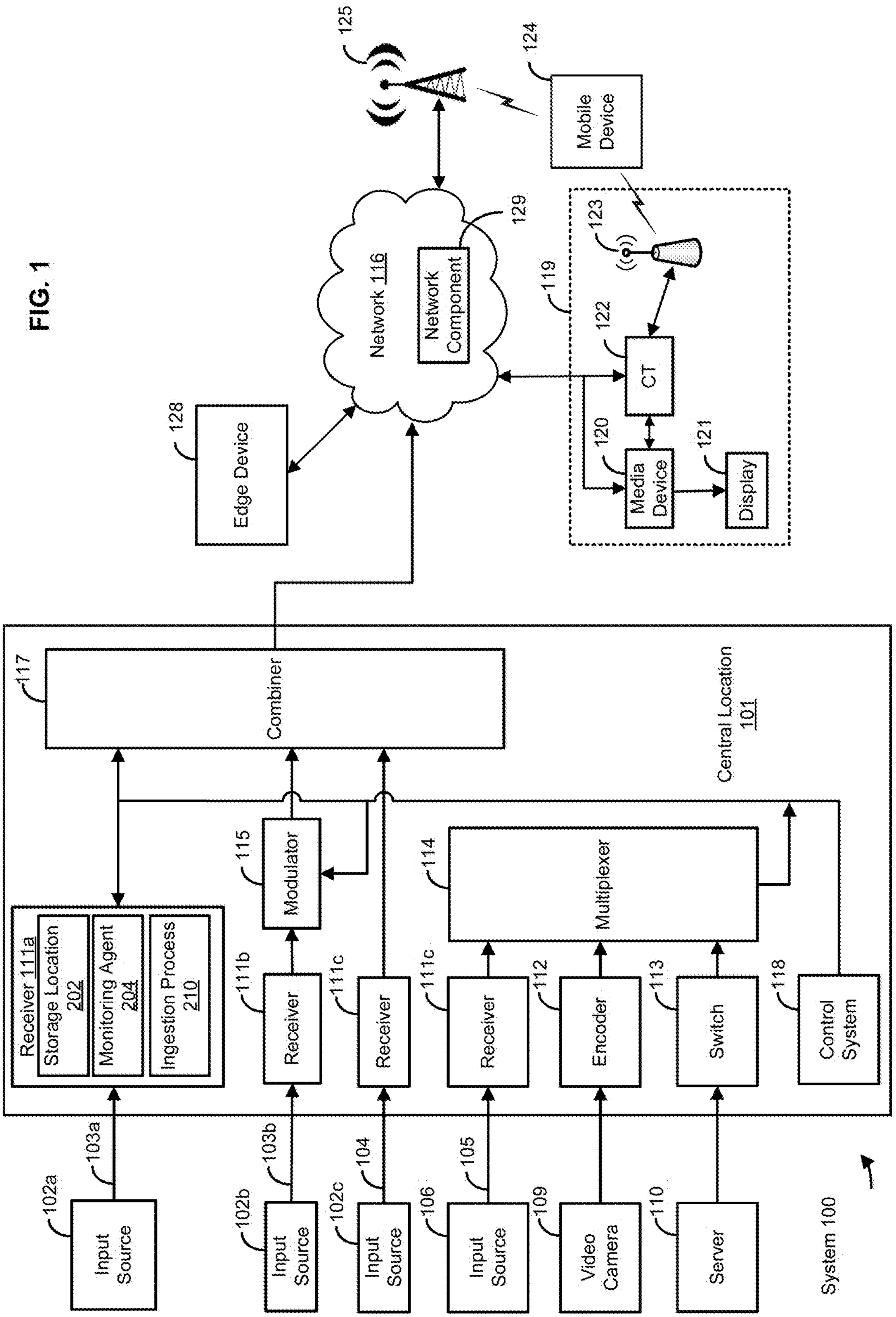
FIG. 1 is a block diagram showing an exemplary content delivery network.

Before the present methods and systems are disclosed and described, it is to be understood that the methods and systems are not limited to specific methods, specific components, or to particular implementations. It is also to be understood that the terminology used herein is for the purpose of describing particular examples only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, an example includes from the one particular value and/or to the other particular value. Similarly, when values are expressed as approximations, by use of the antecedent "about," it will be understood that the particular value forms an example. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal example. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific example or combination of examples of the disclosed methods.

The present methods and systems may be understood more readily by reference to the following detailed description and the examples included therein and to the Figures and their previous and following description.

As will be appreciated by one skilled in the art, the methods and systems may take the form of an entirely hardware example, an entirely software example, or an example combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowcharts of methods, systems, apparatuses and computer program products. It will be understood that each block of the block diagrams and flowcharts, and combinations of blocks in the block diagrams and flowcharts, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowcharts support combinations of means for performing the specified functions, combinations of steps for performing the specified functions and program instruction means for performing the specified functions. It will also be understood that each block of the block diagrams and flowcharts, and combinations of blocks in the block diagrams and flowcharts, can be implemented by special purpose hardware-based computer systems that perform the specified functions or steps, or combinations of special purpose hardware and computer instructions.

In various instances, this detailed description may refer to content items (which may also be referred to as "content," "content data," "content information," "content asset," "multimedia asset data file," or simply "data" or "information"). In some instances, content items can comprise any information or data that may be licensed to one or more individuals (or other entities, such as business or group). In various examples, content may include electronic representations of video, audio, text and/or graphics, which may include but is not limited to electronic representations of videos, movies, or other multimedia, which may include but is not limited to data files adhering to MPEG2, MPEG, MPEG4 UHD, HDR, 4k, Adobe® Flash® Video (.FLV) format or some other video file format whether such format is presently known or developed in the future. In various examples, the content items described herein may include electronic representations of music, spoken words, or other audio, which may include but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may include data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. In some examples, content items may include any combination of the above-described examples.

In various instances, this detailed disclosure may refer to consuming content or to the consumption of content, which may also be referred to as "accessing" content, "providing" content, "viewing" content, "listening" to content, "rendering" content, or "playing" content, among other things. In some cases, the particular term utilized may be dependent on the context in which it is used. For example, consuming video may also be referred to as viewing or playing the video. In an example, consuming audio may also be referred to as listening to or playing the audio.

Note that in various instances this detailed disclosure may refer to a given entity performing some action. It should be understood that this language may in some cases mean that a system (e.g., a computer) owned and/or controlled by the given entity is actually performing the action.

The present disclosure relates to a system for multi-component content asset transfer. A content source can transmit a content asset comprising multiple content items to an ingestion process. The content items can include audio content items, video content items, text content items, image content items, or other content items as can be appreciated. Each of the content items can be described in a manifest for the content asset.

A monitoring agent for the ingestion process can determine if the manifest of the content asset has been received from the content source by determining whether the manifest is stored in a specific storage location such as a directory. If the monitoring agent determines that the manifest is stored, the monitoring agent can generate a plurality of references corresponding to the content items listed in the manifest. The plurality of references can comprise a plurality of reference files, with each reference file corresponding to one of the content items listed in the manifest.

The monitoring agent can determine whether a content item of the content asset has been received from the content source. After determining that a content item has been received, the monitoring agent can provide the content item to an ingestion process. Providing the content item to the ingestion process can include copying, moving, or transmitting the content item from a first storage location to a second storage location accessible to the ingestion process. The monitoring agent can provide a content item to the ingestion process by transmitting a file path or other storage identifier indicating a storage location of the content item.

After providing the content item to the ingestion process, the monitoring agent can modify a state of a reference corresponding to the content item from a first state to a second state, reflecting that the content item has been provided to the ingestion process. Modifying the state of the reference corresponding to the content item from the first state to the second state can include adding or modifying a tag or header of the reference. If the plurality of references comprise a plurality of reference files, modifying the state of the reference corresponding to the content item can include deleting the reference file corresponding to the content item. Thus, the monitoring agent can determine which content items have not been provided to the ingestion process by determining which reference files have not been deleted.

The monitoring agent can continue to monitor the storage location into which content items are stored until all references have been modified from the first state to the second state, i.e. all content items for the content asset have been received and provided to the ingestion process. The monitoring agent can provide the manifest to the ingestion process, indicating to the ingestion process that the entirety of the content asset has been provided to the ingestion process.

FIG. 1 shows various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

The central location 101 can receive content from a variety of input sources 102*a*, 102*b*, 102*c*. The content can be transmitted from the source to the central location 101 via a variety of transmission paths, including wireless (e.g. satellite paths 103*a*, 103*b*) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111*a*, 111*b*, 111*c*, 111*d* that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The systems and methods described above can be implemented in a receiver 111*a,b,c,d*. For example, an input source 102*a* can serve as a content source to provide a content asset to a storage location 202 of the receiver 111*a*. The storage location 202 can include, for example, a directory, one or more areas of allocated memory, a storage device, or other component facilitating data storage. The receiver 111*a* can implement a monitoring agent 204 to determine if a manifest for the content asset is received from the input source 102*a* and generate a plurality of references from the manifest. As the receiver 111*a* receives content items of the content asset from the input source 102*a*, the monitoring agent 204 can provide the received content asset to an ingestion process 210 implemented in the receiver 111*a*. The monitoring agent 204 can modify the state of a corresponding reference from a first state to a second state to indicate receipt of the content item. Although the monitoring agent 204 and ingestion process 210 are depicted as implemented in the receiver 111*a*, it is understood that the monitoring agent 204 and the ingestion process 210 can also be implemented in other components of the system 100. Additional details concerning the interoperability between the storage location 202, the monitoring agent 204 and the ingestion process 210 are set forth below in FIG. 2.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. The network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

A multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

The communication terminal 122 can be located at the user location 119. The communication terminal 122 can be configured to communicate with the network 116. The communication terminal 122 can comprise a modem (e.g., cable modem), a router, a gateway, a switch, a network terminal (e.g., optical network unit), and/or the like. The communication terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

The user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

The user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

The system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

The network 116 can comprise a network component 129. The network component 129 can comprise any device, module, and/or the like communicatively coupled to the network 116. For example, the network component 129 can comprise a router, a switch, a splitter, a packager, a gateway, a encoder, a storage device, a multiplexer, a network access location (e.g., tap), physical link, and/or the like.

Figure 2:
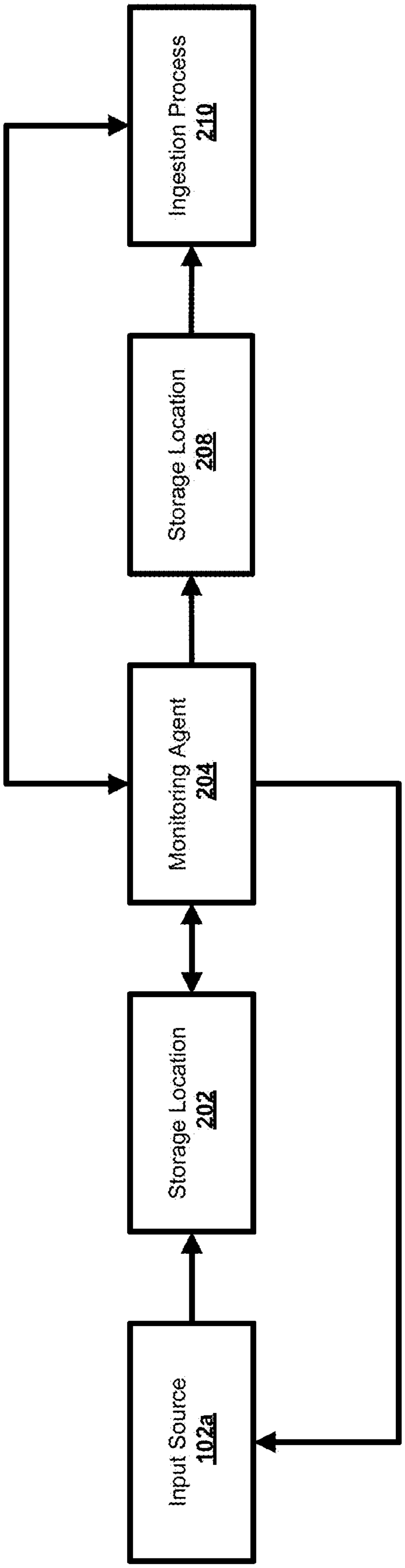
FIG. 2 is a block diagram of a multi-component asset transfer system.

FIG. 2 is a block diagram showing various examples of a multi-component asset transfer system. An input source **102*a* can provide a manifest of a content asset to a storage location 202. The input source 102*a* can comprise a linear content source, a server or file repository, a streaming content source, or other source of content as can be appreciated. The content asset can comprise a plurality of content items, with each content item being listed in the manifest. The storage location 202 can include a directory, a memory address, a storage device, or other portion of memory allocated for data storage. The input source 102*a* can also provide one or more of the plurality of content items of the content asset to the storage location 202. The monitoring agent 204 can monitor the storage location 202 to determine if the manifest has been provided by the input source 102***a*. If the monitoring agent 204 determines that the manifest has been provided by the input source 102*a*, the monitoring agent 204 can generate a plurality of references and store the plurality of references in the storage location 202. Each of the plurality of references can correspond to one of the plurality of content items of the content asset. For example, each of the plurality of references can embody an entry in the manifest for a corresponding one of the plurality of content items. Generating the plurality of references can include generating a plurality of reference files, each of the reference files comprising a manifest entry of the corresponding content item.

The monitoring agent 204 can monitor the storage location 202 for content items received from the input source 102*a*. Monitoring the storage location for content items received from the input source 102*a* can comprise selecting a reference having a first state, and then determining if the content item corresponding to the selected reference is stored in the storage location 202. A reference can have a first state by lacking a tag or header, or having a tag or header, of a predefined value. A reference (e.g., a reference file) can have a first state by being stored in the storage location. If a content item corresponding to a selected reference is stored in the storage location 202, the monitoring agent 204 can provide the content item to an ingestion process 210. Providing the content item to the ingestion process 210 can comprise moving the content item from a storage location 204 to another storage location 208 monitored by the ingestion process 210. Providing the content item to the ingestion process 210 can comprise transmitting instructions to the ingestion process 210 identifying a location of the content item in the storage location 202 or the storage location 208. Such instructions can include an API call, a service call, or other instructions.

After providing the content item to the ingestion process 210, the monitoring agent 204 can modify the state of the reference corresponding to the provided content item from the first state to a second state. Modifying the state of the reference can include adding or modifying a tag, header, or other portion of the reference to indicate that the content item has been provided to the ingestion process 210. Modifying the state of the reference can also include deleting a reference file from the storage location 202 or the storage location 208. The monitoring agent 204 can continue to select references, determine if the corresponding content items are stored in the storage location 202, and provide the content items to the ingestion process until all references have had respective states modified from the first state to the second state, e.g., all references have been tagged or all reference files have been deleted.

The ingestion process 210 can ingest the provided content item by transcoding the content item into one or more variant versions of the content item. For example, the ingestion process 210 can transcode a content item into versions having a varying bit rate, a varying resolution, or otherwise varying. The ingestion process 210 can also ingest the provided content item by applying an integrity check, a digital signature check, or other verification or validation check to the content item. The ingestion process 210 can transmit instructions to the monitoring agent 204 that a content item should be reacquired from the input source 102*a*, such as if a content item fails a verification or validation check, or if an error occurs during transcoding. The ingestion process 210 can also perform other operations to facilitate publication or distribution of a content item. For example, the ingestion process 210 can process, generate, and/or remove metadata of a content item. The ingestion process 210 can group content items of a content asset. The monitoring agent 204 can then regenerate the reference corresponding to the content item to be reacquired. The monitoring agent 204 can transmit a request to the input source 102*a* for the content item to be reacquired. As the regenerated reference now has a first state, the monitoring agent 204 can determine if the content item has been reacquired for providing to the ingestion process 210 as described above.

FIG. 3 is a representation of an example manifest 300 for a content asset. Although the manifest 300 is shown as encoded in Extensible Markup Language (XML), it is understood that the manifest 300 can be encoded or described by other approaches. Included in the manifest 300 is an entry 302 for a content asset, in this case the film "Night of the Living Dead." The entry 302 for the content asset has child entries 304 for two groups of content items: a first grouping of content items for the main feature, and a second grouping of content items for the trailer. Each grouping of content items has child entries 306 each describing a particular content item that makes up the content asset. For example, the grouping of content items for the main feature includes child entries 306 (and therefore content items) corresponding to a video file for the main feature, English and Spanish language tracks, a French subtitle track, a description of the main feature, and a thumbnail image. The grouping of the content items for the trailer includes a video file for the trailer and a thumbnail image.

Each child entry 306 can include one or more fields. The one or more fields can describe a corresponding content item. For example, each child entry 306 can include a file identifier for the content item, an indication of a type of content item, and a checksum for performing validation or verification of the corresponding content item. The one or more fields of the child entries 306 can describe a corresponding content item.

Figure 4:
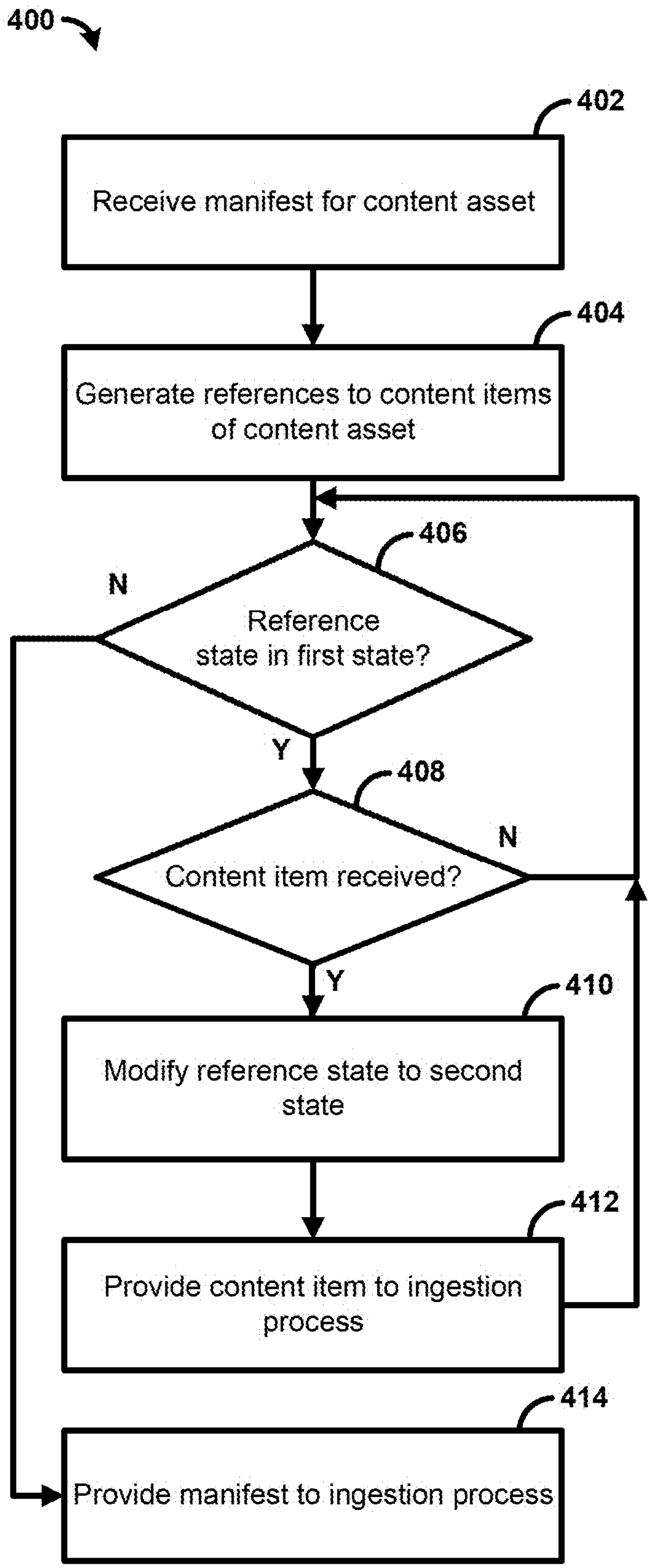
FIG. 4 is a flowchart of an example method.

FIG. 4 is a flowchart of an example method 400. At step 402, a manifest for a content asset can be received. The content asset can comprise multiple content items described by the manifest. The content items can include audio content items, video content items, text content items, image content items, or other content items as can be appreciated. The manifest can be encoded in Extended Markup Language (XML), or by another approach. Each entry in the manifest can include an identifier of a corresponding content item. The identifier can include a file name, hash value, unique identifier, or other identifier. Each entry in the manifest can describe a content item type of the corresponding content item. For example, an entry can identify a given content item as a video content item, a text content item, an image content item, or another type of content item. Each entry can identify a priority ranking or priority tier of the corresponding content item.

In step 404, a plurality of references corresponding to the content items listed in the manifest can be generated. The plurality of references can each include an identifier of a corresponding content item such as a file name, hash code, digital signature, or other identifier of the corresponding content item. The plurality of references can each include metadata describing the content item. The included metadata can indicate a content type of a content item, a priority of a content item, or otherwise describe a content item. The included metadata can also include a header, tag, or other metadata entry indicating a state of a reference. The state of the reference indicates whether the corresponding content item has been transmitted to an ingestion process, as described below. The plurality of references can be embodied as a single file or a plurality of files. The plurality of references can be embodied as a list, table, or other data structure stored in memory as can be appreciated.

In step 406, it can be determined whether a reference exists in a first state, e.g., whether a reference indicates the corresponding content item has yet to be provided to an ingestion process. Determining whether a reference exists in a first state can include accessing each reference to determine if a reference includes or lacks a predefined tag or header. If no references exist in the first state, thereby indicating that all content items of the content asset have been provided to the ingestion process, the manifest can be provided to the ingestion process in step 414. Otherwise, if a reference exists in the first state, in step 408, it can be determined whether the content item corresponding to the reference in the first state has been received from the content source. Determining whether the content item corresponding to the reference in the first state can include determining whether a content item is stored having a file name or other identifier matching an identifier indicated in the reference. If the content item corresponding to the reference in the first state has not been received, the method 400 can return to step 406. Otherwise, if the content item corresponding to the reference in the first state has been received, in step 410, the state of the reference corresponding to the received content item can be modified from the first state to a second state. Modifying the state of the reference from the first state to the second state can include adding, removing, or modifying a tag, header, or other value of the reference. After modifying the state of the reference, in step 412, the received content item can be provided to the ingestion process.

Providing the content item to the ingestion process can include transmitting the content item to one or more ingestion devices, e.g., one or more computing devices. Providing the content item to the ingestion process can include copying, moving, or transmitting the content item from a first storage location to a second storage location accessible to the ingestion process. For example, the ingestion process can be configured to monitor a given directory for the presence of content items. If a content item is stored in the directory, the ingestion process begins ingestion of the stored content item. The content item can be provided to the ingestion process by transmitting a service call, an application program interface (API) call, or other instructions to the ingestion process. The instructions can comprise the content item. For example, a content item may be serializable, and a serialized transformation of the content item can be included in the instructions transmitted to the ingestion process. The instructions can indicate a file path or other storage identifier indicating a storage location of the content item. The storage identifier can facilitate an access of the content item by the ingestion process directly from a storage location without a need for transferring the content item to a second storage location accessible to the ingestion process. After providing the content item to the ingestion process, the method can return to step 406.

The ingestion process can facilitate transcoding the provided content item. For example, the ingestion process can transcode a provided video or audio content item into variant content items of varying bitrates or resolutions. The ingestion process can perform a validation check otherwise evaluate the provided content item. A validation check can include calculating a checksum, hash value, digital signature, or other value based on the provided content item.

Figure 5:
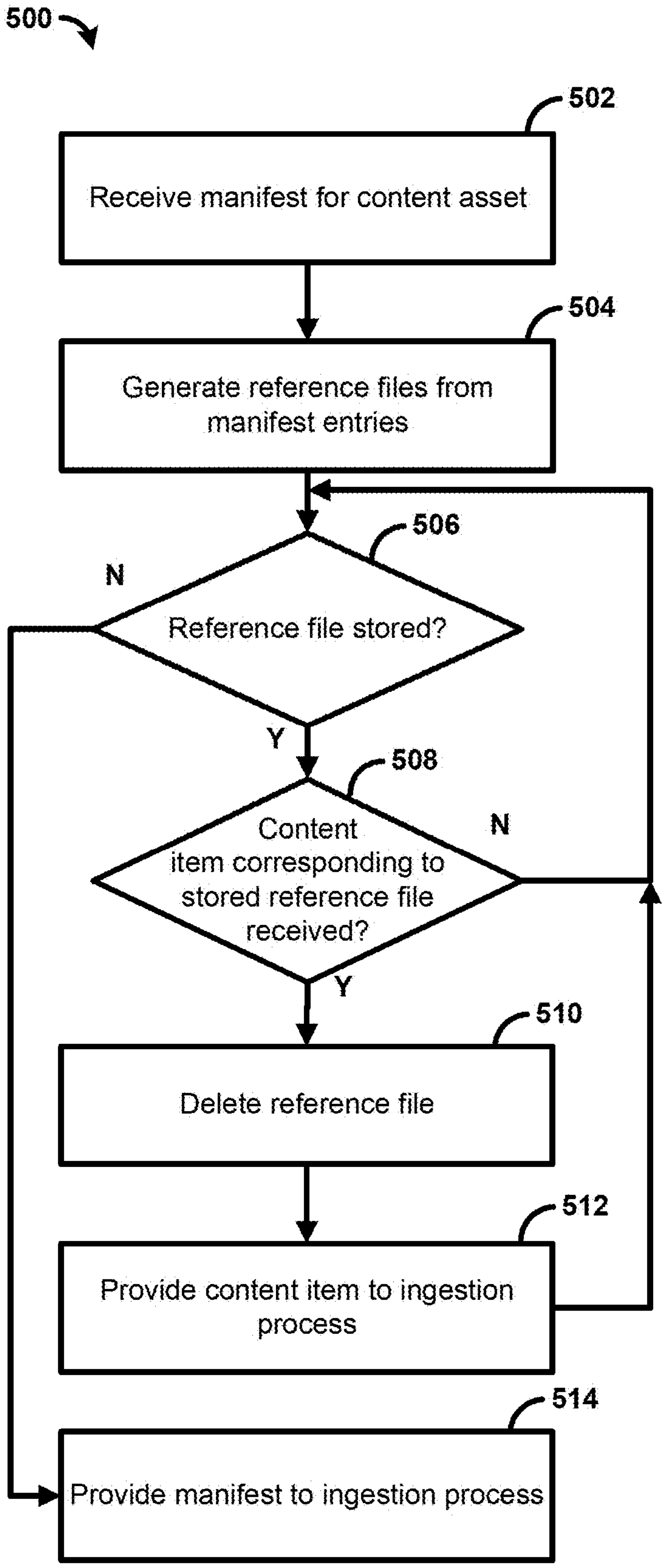
FIG. 5 is a flowchart of an example method.

FIG. 5 is a flowchart of an example method 500. At step 502, a manifest for a content asset can be received. The content asset can comprise multiple content items described by the manifest. The content items can include audio content items, video content items, text content items, image content items, or other content items as can be appreciated. The manifest can be encoded in Extended Markup Language (XML), or by another approach. Each entry in the manifest can include an identifier of a corresponding content item. The identifier can include a file name, hash value, unique identifier, or other identifier. Each entry in the manifest can describe a content item type of the corresponding content item. For example, an entry can identify a given content item as a video content item, a text content item, an image content item, or another type of content item. Each entry can identify a priority ranking or priority tier of the corresponding content item.

In step 504, a plurality of reference files corresponding to the content items listed in the manifest can be generated. The plurality of reference files can each include an identifier of a corresponding content item such as a file name, hash code, digital signature, or other identifier of the corresponding content item. The plurality of references can each include metadata describing the content item. The included metadata can indicate a content type of a content item, a priority of a content item, or otherwise describe a content item. Generating the plurality of reference files can include copying an entry from the manifest into a respective one of the plurality of reference files. Thus, the plurality of reference files can embody a splitting or division of the manifest into separate reference files. The plurality of reference files can be stored in a storage location such as a directory, storage device, or memory address.

In step 506, it can be determined whether a reference file from the plurality of reference files is stored in the storage location. If no reference files are stored in the storage location, thereby indicating that all content items of the content asset have been provided to the ingestion process, the manifest is provided to the ingestion process in step 514. Otherwise, at step 506, if a reference file is currently stored, indicating that the corresponding content item has yet to be provided to the ingestion process, it can be determined whether the content item corresponding to the stored reference file has been received at step 508. Determining whether the content item corresponding to the stored reference file has been received can include determining whether a content item is stored having a file name or other identifier matching an identifier indicated in the reference file. If the content item corresponding to the stored reference file has not been received, it can be determined whether a reference file from the plurality of reference files is stored in the storage location at step 506. Thus, it can be determined which content items of the content asset have been provided to an ingestion process by determining which of the plurality of reference files are still stored. Otherwise, if the content item corresponding to the stored reference file has been received, where the reference file can be deleted at step 510. In step 512, the received content item can be provided to the ingestion process.

Providing the content item to the ingestion process can include transmitting the content item to one or more ingestion devices, e.g., one or more computing devices. Providing the content item to the ingestion process can include copying, moving, or transmitting the content item from a first storage location to a second storage location accessible to the ingestion process. For example, the ingestion process can be configured to monitor a given directory for the presence of content items. If a content item is stored in the directory, the ingestion process begins ingestion of the stored content item. The content item can be provided to the ingestion process by transmitting a service call, an application program interface (API) call, or other instructions to the ingestion process. The instructions can comprise the content item. For example, a content item may be serializable, and a serialized transformation of the content item can be included in the instructions transmitted to the ingestion process. The instructions can indicate a file path or other storage identifier indicating a storage location of the content item. The storage identifier can facilitate an access of the content item by the ingestion process directly from a storage location without a need for transferring the content item to a second storage location accessible to the ingestion process. After providing the content item to the ingestion process, it can be determined whether a reference file from the plurality of reference files is stored in the storage location at step 506.

The ingestion process can facilitate transcoding the provided content item. For example, the ingestion process can transcode a provided video or audio content item into variant content items of varying bitrates or resolutions. The ingestion process can perform a validation check otherwise evaluate the provided content item. A validation check can include calculating a checksum, hash value, digital signature, or other value based on the provided content item.

Figure 6:
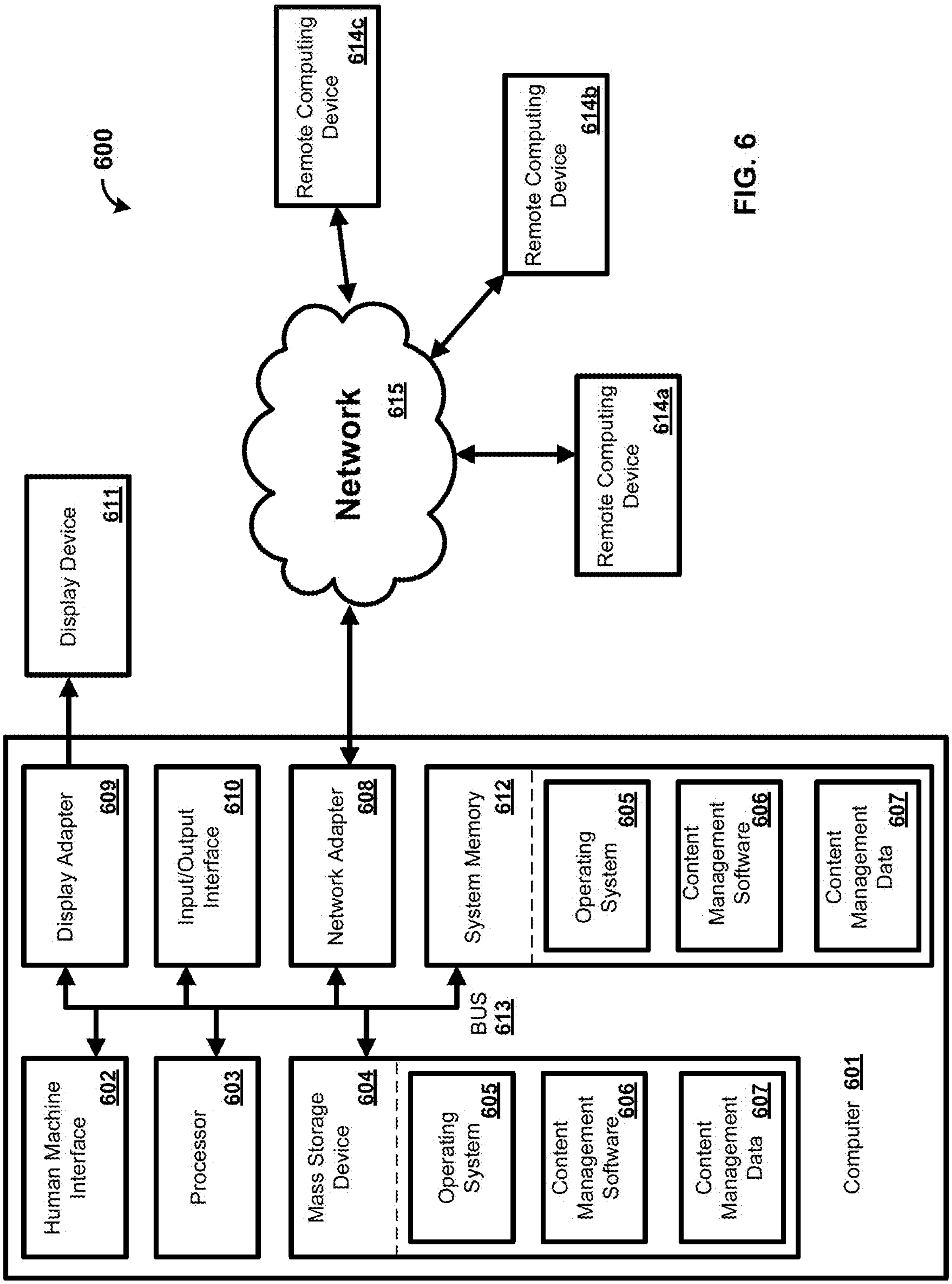
FIG. 6 is a block diagram of an example computing device.

The methods and systems can be implemented on a computer 601 as shown in FIG. 6 and described below. Similarly, the methods and systems disclosed can utilize one or more computers to perform one or more functions in one or more locations. FIG. 6 is a block diagram showing an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components shown in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors 603, a system memory 612, and a system bus 613 that couples various system components including the one or more processors 603 to the system memory 612. The system can utilize parallel computing.

The system bus 613 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the one or more processors 603, a mass storage device 604, an operating system 605, content management software 606, content management data 607, a network adapter 608, the system memory 612, an Input/Output Interface 610, a display adapter 609, a display device 611, and a human machine interface 602, can be contained within one or more remote computing devices 614*a,b,c* at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data such as the content management data 607 and/or program modules such as the operating system 605 and the content management software 606 that are immediately accessible to and/or are presently operated on by the one or more processors 603.

The computer 601 can also comprise other removable/non-removable, volatile/non-volatile computer storage media. By way of example, FIG. 5 shows the mass storage device 604 which can provide non-volatile storage of computer code, computer readable instructions, data structures, program modules, and other data for the computer 601. For example and not meant to be limiting, the mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, the operating system 605 and the content management software 606. Each of the operating system 605 and the content management software 606 (or some combination thereof) can comprise elements of the programming and the content management software 606. The content management data 607 can also be stored on the mass storage device 604. The content management data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The user can enter commands and information into the computer 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 603 via the human machine interface 602 that is coupled to the system bus 613, but can be connected by other interface and bus structures, such as a parallel port, game port, an IEEE 1394 Port (also known as a Firewire port), a serial port, or a universal serial bus (USB).

The display device 611 can also be connected to the system bus 613 via an interface, such as the display adapter 609. It is contemplated that the computer 601 can have more than one display adapter 609 and the computer 601 can have more than one display device 611. For example, the display device 611 can be a monitor, an LCD (Liquid Crystal Display), or a projector. In addition to the display device 611, other output peripheral devices can comprise components such as speakers (not shown) and a printer (not shown) which can be connected to the computer 601 via the Input/Output Interface 610. Any step and/or result of the methods can be output in any form to an output device. Such output can be any form of visual representation, including, but not limited to, textual, graphical, animation, audio, tactile, and the like. The display device 611 and computer 601 can be part of one device, or separate devices.

The computer 601 can operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computer 601 and a remote computing device 614*a,b,c* can be made via a network 615, such as a local area network (LAN) and/or a general wide area network (WAN). Such network connections can be through the network adapter 608. The network adapter 608 can be implemented in both wired and wireless environments. Such networking environments are conventional and commonplace in dwellings, offices, enterprise-wide computer networks, intranets, and the Internet.

As an example, application programs and other executable program components such as the operating system 605 are shown herein as discrete blocks, although it is recognized that such programs and components reside at various times in different storage components of the computing device 601, and are executed by the one or more processors 603 of the computer. An implementation of the content management software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with specific examples, it is not intended that the scope be limited to the particular examples set forth, as the examples herein are intended in all respects to be exemplary rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other examples will be apparent to those skilled in the art from consideration of the specification and practice disclosed herein. It is intended that the specification and examples be considered as exemplary only, with a true scope and spirit being indicated by the following claims.

The invention claimed is:

1. An apparatus comprising:

one or more processors; and a memory storing processor-executable instructions that, when executed by the one or more processors, cause the apparatus to:

send, based on determining that a component content item of a plurality of component content items of a content asset has been received from a content source, the component content item to one or more ingestion devices;

send, based on a state of the component content item indicating that the component content item has been sent to the one or more ingestion devices, another component content item of the plurality of component content items to the one or more ingestion devices;

determine, based on a corresponding state of each component content item of the plurality of component content items indicating that each component content item has been sent, that the content asset has been sent to the one or more ingestion devices; and send an indication that the content asset has been sent to the one or more ingestion devices.

2. The apparatus of claim 1, wherein the processor-executable instructions that, when executed by the one or more processors, cause the apparatus to send the component content item, further cause the apparatus to send a storage identifier indicating a file path or a storage location of the component content item.

3. The apparatus of claim 1, wherein the processor-executable instructions that, when executed by the one or more processors, cause the apparatus to send the another component content item, further cause the apparatus to:

determine that the state of the component content item changed from a first state to a second state; and determine, based on the change from the first state to the second state, that the component content item has been sent to the one or more ingestion devices.

4. The apparatus of claim 1, wherein the processor-executable instructions that, when executed by the one or more processors, cause the apparatus to determine that the content asset has been sent to the one or more ingestion devices, further cause the apparatus to determine, based on a tag or a header associated with the plurality of component content items being modified, that the content asset has been sent to the one or more ingestion devices.

5. The apparatus of claim 1, wherein the content asset comprises the plurality of component content items, and wherein the plurality of component content items comprise at least one of: audio content items, video content items, text content items, or image content items.

6. The apparatus of claim 1, wherein the processor-executable instructions, when executed by the one or more processors, further cause the apparatus to:

receive, from the content source, a manifest for the plurality of component content items of the content asset; and send, to the one or more ingestion devices, and after the content asset has been sent to the one or more ingestion devices, the manifest.

7. The apparatus of claim 1, wherein the processor-executable instructions, when executed by the one or more processors, further cause the apparatus to receive, from the one or more ingestion devices, an indication that the component content item should be reacquired from the content source.

8. The apparatus of claim 1, wherein the processor-executable instructions, when executed by the one or more processors, further cause the apparatus to delete, from a storage location and based on determining that the content asset has been sent to the one or more ingestion devices, a plurality of files associated with the plurality of component content items.

9. One or more non-transitory computer-readable media storing processor-executable instructions that, when executed by at least one processor, cause the at least one processor to:

send, based on determining that a component content item of a plurality of component content items of a content asset has been received from a content source, the component content item to one or more ingestion devices;

send, based on a state of the component content item indicating that the component content item has been sent to the one or more ingestion devices, another component content item of the plurality of component content items to the one or more ingestion devices;

determine, based on a corresponding state of each component content item of the plurality of component content items indicating that each component content item has been sent, that the content asset has been sent to the one or more ingestion devices; and send an indication that the content asset has been sent to the one or more ingestion devices.

10. The non-transitory computer-readable media of claim 9, wherein the processor-executable instructions that, when executed by the at least one processor, cause the at least one processor to send the component content item, further cause the at least one processor to send a storage identifier indicating a file path or a storage location of the component content item.

11. The non-transitory computer-readable media of claim 9, wherein the processor-executable instructions that, when executed by the at least one processor, cause the at least one processor to send the another component content item, further cause the at least one processor to:

determine that the state of the component content item changed from a first state to a second state; and determine, based on the change from the first state to the second state, that the component content item has been sent to the one or more ingestion devices.

12. The non-transitory computer-readable media of claim 9, wherein the processor-executable instructions that, when executed by the at least one processor, cause the at least one processor to determine that the content asset has been sent to the one or more ingestion devices, further cause the at least one processor to determine, based on a tag or a header associated with the plurality of component content items being modified, that the content asset has been sent to the one or more ingestion devices.

13. The non-transitory computer-readable media of claim 9, wherein the content asset comprises the plurality of component content items, and wherein the plurality of component content items comprise at least one of: audio content items, video content items, text content items, or image content items.

14. The non-transitory computer-readable media of claim 9, wherein the processor-executable instructions, when executed by the at least one processor, further cause the at least one processor to:

receive, from the content source, a manifest for the plurality of component content items of the content asset; and send, to the one or more ingestion devices, and after the content asset has been sent to the one or more ingestion devices, the manifest.

15. The non-transitory computer-readable media of claim 9, wherein the processor-executable instructions, when executed by the at least one processor, further cause the at least one processor to receive, from the one or more ingestion devices, an indication that the component content item should be reacquired from the content source.

16. The non-transitory computer-readable media of claim 9, wherein the processor-executable instructions, when executed by the at least one processor, further cause the at least one processor to delete, from a storage location and based on determining that the content asset has been sent to the one or more ingestion devices, a plurality of files associated with the plurality of component content items.

17. A system comprising:

a computing device configured to:

send, based on determining that a component content item of a plurality of component content items of a content asset has been received from a content source, the component content item to one or more ingestion devices, send, based on a state of the component content item indicating that the component content item has been sent to the one or more ingestion devices, another component content item of the plurality of component content items to the one or more ingestion devices, determine, based on a corresponding state of each component content item of the plurality of component content items indicating that each component content item has been sent, that the content asset has been sent to the one or more ingestion devices, and send an indication that the content asset has been sent to the one or more ingestion devices; and the one or more ingestion devices configured to:

receive the plurality of component content items, and receive the indication that the content asset has been sent to the one or more ingestion devices.

18. The system of claim 17, wherein the computing device is configured to send the component content item, the computing device is further configured to send a storage identifier indicating a file path or a storage location of the component content item.

19. The system of claim 17, wherein the computing device is configured to send the another component content item, the computing device is further configured to:

determine that the state of the component content item changed from a first state to a second state; and determine, based on the change from the first state to the second state, that the component content item has been sent to the one or more ingestion devices.

20. The system of claim 17, wherein the computing device is configured to determine that the content asset has been sent to the one or more ingestion devices, the computing device is further configured to determine, based on a tag or a header associated with the plurality of component content items being modified, that the content asset has been sent to the one or more ingestion devices.

21. The system of claim 17, wherein the content asset comprises the plurality of component content items, and wherein the plurality of component content items comprise at least one of: audio content items, video content items, text content items, or image content items.

22. The system of claim 17, wherein the computing device is further configured to:

receive, from the content source, a manifest for the plurality of component content items of the content asset; and send, to the one or more ingestion devices, and after the content asset has been sent to the one or more ingestion devices, the manifest.

23. The system of claim 17, wherein the computing device is further configured to receive, from the one or more ingestion devices, an indication that the component content item should be reacquired from the content source.

24. The system of claim 17, wherein the computing device is further configured to delete, from a storage location and based on determining that the content asset has been sent to the one or more ingestion devices, a plurality of files associated with the plurality of component content items.

25. An apparatus comprising:

one or more processors; and a memory storing processor-executable instructions that, when executed by the one or more processors, cause the apparatus to:

send, based on determining that a component content item of a plurality of component content items of a content asset has been received from a content source, the component content item to one or more ingestion devices;

send, prior to receiving the plurality of component content items, another component content item of the plurality of component content items to the one or more ingestion devices; and determine, based on a corresponding state of each component content item of the plurality of component content items indicating that each component content item has been sent, that the content asset has been sent to the one or more ingestion devices.

26. The apparatus of claim 25, wherein the processor-executable instructions that, when executed by the one or more processors, cause the apparatus to send the component content item to the one or more ingestion devices, further cause the apparatus to send the component content item to the one or more ingestion devices based on storing the plurality of component content items at a location accessible to the one or more ingestion devices.

27. The apparatus of claim 25, wherein the processor-executable instructions that, when executed by the one or more processors, cause the apparatus to send the component content item, further cause the apparatus to delete a file associated with the component content item for indicating that the component content item has been sent to the one or more ingestion devices.

28. The apparatus of claim 25, wherein the plurality of component content items comprises at least one of: a video file, a trailer, a thumbnail image, metadata, a language track, or a subtitle track.

29. The apparatus of claim 25, wherein the processor-executable instructions, when executed by the one or more processors, further cause the apparatus to:

receive, from the one or more ingestion devices, an indication that one component content item of the plurality of component content items should be reacquired from the content source; and determine, based on the indication, an identifier corresponding to the one component content item.

30. The apparatus of claim 25, wherein the processor-executable instructions, when executed by the one or more processors, further cause the apparatus to receive a request to reacquire the another component content item based on at least one of: a transcoding error associated with the another component content item, a validation error of the another component content item, or a verification error associated with the another component content item.

31. One or more non-transitory computer-readable media storing processor-executable instructions that, when executed by at least one processor, cause the at least one processor to:

send, based on determining that a component content item of a plurality of component content items of a content asset has been received from a content source, the component content item to one or more ingestion devices;

send, prior to receiving the plurality of component content items, another component content item of the plurality of component content items to the one or more ingestion devices; and determine, based on a corresponding state of each component content item of the plurality of component content items indicating that each component content item has been sent, that the content asset has been sent to the one or more ingestion devices.

32. The non-transitory computer-readable media of claim 31, wherein the processor-executable instructions that, when executed by the at least one processor, cause the at least one processor to send the component content item to the one or more ingestion devices, further cause the at least one processor to send the component content item to the one or more ingestion devices based on storing the plurality of component content items at a location accessible to the one or more ingestion devices.

33. The non-transitory computer-readable media of claim 31, wherein the processor-executable instructions that, when executed by the at least one processor, cause the at least one processor to send the component content item, further cause the at least one processor to delete a file associated with the component content item for indicating that the component content item has been sent to the one or more ingestion devices.

34. The non-transitory computer-readable media of claim 31, wherein the plurality of component content items comprises at least one of: a video file, a trailer, a thumbnail image, metadata, a language track, or a subtitle track.

35. The non-transitory computer-readable media of claim 31, wherein the processor-executable instructions, when executed by the at least one processor, further cause the at least one processor to:

receive, from the one or more ingestion devices, an indication that one component content item of the plurality of component content items should be reacquired from the content source; and determine, based on the indication, an identifier corresponding to the one component content item.

36. The non-transitory computer-readable media of claim 31, wherein the processor-executable instructions, when executed by the at least one processor, further cause the at least one processor to receive a request to reacquire the another component content item based on at least one of: a transcoding error associated with the another component content item, a validation error of the another component content item, or a verification error associated with the another component content item.

37. A system comprising:

a computing device configured to:

send, based on determining that a component content item of a plurality of component content items of a content asset has been received from a content source, the component content item to one or more ingestion devices, send, prior to receiving the plurality of component content items, another component content item of the plurality of component content items to the one or more ingestion devices, and determine, based on a corresponding state of each component content item of the plurality of component content items indicating that each component content item has been sent, that the content asset has been sent to the one or more ingestion devices; and the one or more ingestion devices configured to receive the plurality of component content items.

38. The system of claim 37, wherein the computing device is configured to send the component content item to the one or more ingestion devices, the computing device is further configured to send the component content item to the one or more ingestion devices based on storing the plurality of component content items at a location accessible to the one or more ingestion devices.

39. The system of claim 37, wherein the computing device is configured to send the component content item, the computing device is further configured to delete a file associated with the component content item for indicating that the component content item has been sent to the one or more ingestion devices.

40. The system of claim 37, wherein the plurality of component content items comprises at least one of: a video file, a trailer, a thumbnail image, metadata, a language track, or a subtitle track.

41. The system of claim 37, wherein the computing device is further configured to:

receive, from the one or more ingestion devices, an indication that one component content item of the plurality of component content items should be reacquired from the content source; and determine, based on the indication, an identifier corresponding to the one component content item.

42. The system of claim 37, wherein the computing device is further configured to receive a request to reacquire the another component content item based on at least one of: a transcoding error associated with the another component content item, a validation error of the another component content item, or a verification error associated with the another component content item.

* * * * *